United States Patent
Bitko

[15] 3,674,976
[45] July 4, 1972

[54] WELDING HEAD FOR PRODUCING UNIFORM AND REPEATABLE RESISTANCE WELDS

[72] Inventor: Sheldon S. Bitko, Cherry Hill, N.J.
[73] Assignee: Fifth Dimension Inc., Princeton, N.J.
[22] Filed: Nov. 13, 1970
[21] Appl. No.: 89,391

[52] U.S. Cl.............................................219/86, 219/91
[51] Int. Cl..............................................B23k 9/28
[58] Field of Search........................219/86–89, 78, 219/117, 91, 149, 153

[56] References Cited

UNITED STATES PATENTS 3,316,383   4/1967   Hill...........................................219/86
3,303,316   2/1967   Bogosian.................................219/78

Primary Examiner—J. V. Truhe
Assistant Examiner—L. A. Schutzman
Attorney—Hurvitz & Rose

[57] ABSTRACT

In a welding head, the weight of a substantially free-falling body is applied to a welding electrode via a lever, the mechanical advantage introduced by the lever being selected to achieve a predetermined movement of said electrode into a body to be welded during a predetermined time interval, irrespective of the magnitude of the weight, the weight being selected to apply a predetermined weld pressure at the electrode via the mechanical advantage of the lever. Timing operation depends solely on a falling weight and hence is perfectly reproducible for a variety of weld pressures.

5 Claims, 7 Drawing Figures

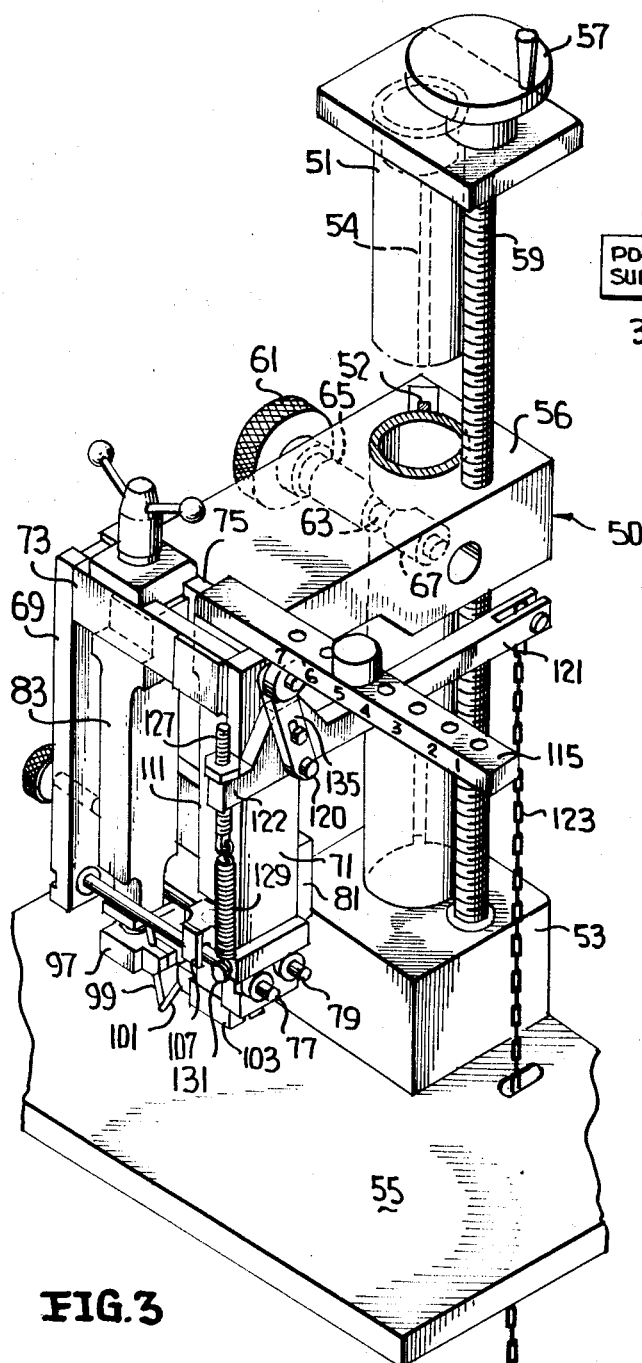

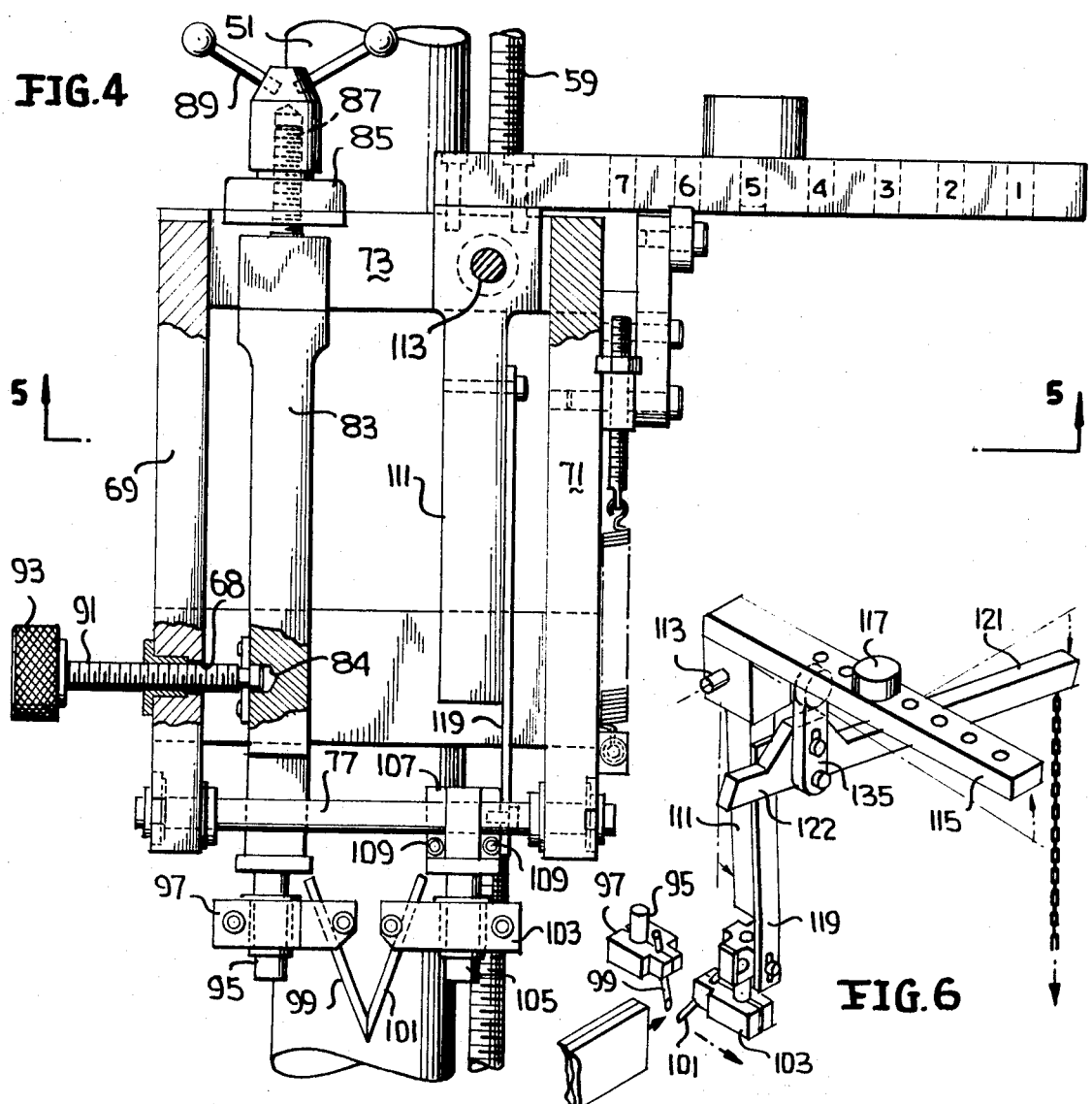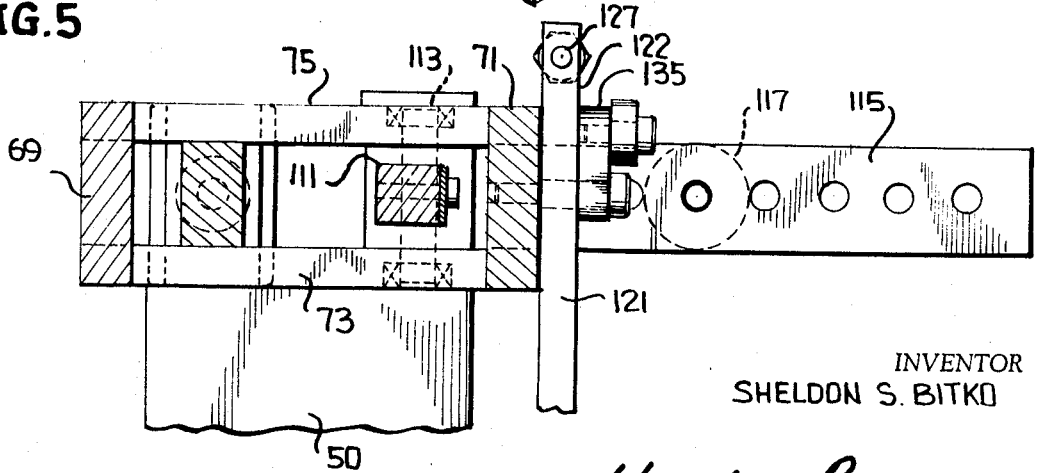

3,674,976

WELDING HEAD FOR PRODUCING UNIFORM AND REPEATABLE RESISTANCE WELDS

BACKGROUND OF THE INVENTION

The present invention relates to electric-resistance welding, and more particularly to apparatus and method for obtaining precise weld depths and welding pressures.

Microminiaturization and associated development in the fabrication of electronic components require precision component bonding techniques which heretofore were beyond the state of the resistance welding art. The problem has been primarily due to the inability to accurately control the welding force applied to the workpiece and to accurately control the depth of penetration of the welding electrodes into the workpiece. The latter factor requires control over the rate of movement of the electrode into the relatively thin workpiece when the latter is softened by weld current.

In one prior art weld head, as described in U. S. Pat. No. 3,316,383 to Hill, an arrangement of levers is employed whereby a weight applied to one lever causes the electrodes to exert a force against a workpiece, the force being adjustable by adjustment of the weighted lever arm length. However, setting the weighted lever arm length automatically determines the rate at which the electrodes penetrate the workpiece, being no independent adjustment for this latter parameter. Consequently, Hill cannot readily optimize both welding force and weld depth.

It is therefore an object of the present invention to provide a resistance-welding method and apparatus in which a welding force and weld depth are independently and accurately controlled.

It is another object of the present invention to provide a welding method and apparatus wherein the rate of free fall of the weld head and/or interval during which weld current is applied to pieces to be welded may be independently selected to accurately determine the depth of penetration of the weld head into the workpiece and the welding force may be independently selected by variation of the effective weight of the weld head acting upon the workpiece.

It is another object of the present invention to provide a welding head which permits precise control over both the forging force applied against a workpiece and the rate at which an electrode penetrates the workpiece during welding current flow.

It is another object of the present invention to provide a welding head and method which permits welds of precise depth and uniform characteristics to be obtained.

SUMMARY OF THE INVENTION

The present invention concerns a welding machine in which a weld head is urged against a workpiece by a freely falling weight acting upon the weld head through a variable length lever arm, the length of the lever arm determining the rate of fall of the weld head whereby the depth of penetration of the weld electrode into the weld is a function of both lever arm and the length of the weld current pulse and the forging force is independently determined by selection of the mass of the freely falling weight.

BRIEF DESCRIPTION OF THE DRAWINGS

The above and still further objects, features and advantages of the present invention will become apparent upon consideration of the following detailed description of specific embodiments thereof, especially when taken in conjunction with the accompanying drawings, wherein:

FIG. 1 is a diagrammatic representation of a welding head employing the principles of the present invention;

FIG. 2 is a diagrammatic representation of an alternative embodiment of a welding head employing the principles of the present invention;

FIG. 3 is a view in perspective of a welding head employing the principles diagrammatically illustrated in FIG. 2;

FIG. 4 is a partial front view in plan of the welding head of FIG. 3;

FIG. 5 is a view in section taken along lines 5—5 of FIG. 4;

FIG. 6 is a view in perspective of a cut-away portion of a welding head of FIG. 3; and FIG. 7 is a partial view in plan of the configuration of the electrodes relative to a workpiece in the apparatus of FIG. 3.

DESCRIPTION OF THE PREFERRED EMBODIMENTS

Referring specifically to FIG. 1 of the accompanying drawings there is illustrated a generally U-shaped folded beam 10 having a pair of horizontally-extending lever arms 11 and 13 joined at their ends by a connecting arm 15 which is substantially perpendicular to the two lever arms. The connecting arm 15 is pivotally mounted at 17 on a support structure 19 such that lever arms 11 and 13 are pivotable currently about pivot point 17. Arm 13 supports a generally vertical welding electrode 21 proximate the end of arm 13 remote from connecting arm 15. The distance along arm 13 between electrode 21 and connecting arm 15 is designated by the letter $x$ in the drawing. A second welding electrode 23 is fixedly secured to support member 19 in general alignment with electrode 21 and spaced from the latter to permit insertion of workpieces 25 and 27 between the electrodes when lever arm 13 is substantially horizontal. Electrode 23 may be rendered vertically adjustable to accommodate different size workpieces between the electrodes; in any case, electrode 23 remains fixed during a welding operation. Alternatively, electrodes 21 and 23 may be borne by lever arm 13 in spaced relation to abut a common surface of a workpiece upon which a welding operation is to be effected, a support being provided below the workpiece to permit the electrodes to exert a welding force against the workpiece.

A weld power supply 29 is connected by means of leads 31 and 33 to respective electrodes 21 and 23 to provide a specified weld current between the electrode for a known time interval. It is desirable, although not required for the purpose of the present invention, that weld power supply 29 be capable of delivering a weld current pulse of width or time duration which may be varied by the operator.

A weight 35 is disposed on lever arm 11 at an adjustable distance $y$ from connecting arm 15. Weight 35 exerts a downward force $W$ on arm 11 to provide a counter-clockwise torque, $Wy$, on beam 10 about point 17. This torque is reflected in arm 13 which exerts a force against the workpieces 25 and 27 via electrode 21. This latter force produces a reactive force $F$ against arm 13 to balance beam 10 in a position of equilibrium determined by the expression $Wy = Fx$. Beam 10 remains in this equilibrium position until such time as welding current through the electrodes and workpiece softens the workpiece and permits collapses of the metal under the force applied by the welding electrode 21. Upon weld collapse the resistance to downward movement of electrode 21 becomes negligible and consequently beam 10 begins to pivot counter-clockwise about pivot point 17. The rate at which beam 10 pivots is determined by the substantially free-fall of weight 35, accelerating at approximately the gravitational acceleration constant 32.2 ft/sec². Thus the weight 35 falls a distance S which is determined by the following expression:

$$S = \tfrac{1}{2} at^2 \qquad (1)$$

where $a$ is equal to the gravitational acceleration constant, and $t$ is equal to the time during which weight 35 is permitted to fall from its initial position.

In correspondence to weight 35 moving a distance $S$, electrode 21 must move vertically downward a distance $d$ which is dependent upon $S$ and the ratio of moment arms $y$ and $x$. More particularly, $$d = Sx/y. \qquad (2)$$

Substituting $S$ from equation (1) into equation (2):

$$d = xat^2/2y \qquad (3)$$

Importantly, depth $d$ is independent of weight $W$.

The weight 35 free-falls only when the workpiece is sufficiently soft to present negligible resistance to motion by the electrodes. Workpiece softening begins at substantially the same time as weld current is initiated and free-fall persists until immediately after the weld current is terminated. Upon termination of the weld current the workpiece cools rapidly. During cooling, movement of the electrode and weight 35 continues but at a decelerating rate due to the increasing resistance presented by the solidifying metal. Because of the rapid cooling, decelerating movement of the electrode occurs over a considerably smaller distance than that produced during the previous free-fall of weight 35. The electrode motion occurring during cooling is small and readily subject to empirical compensation by an operator having the benefit of performing previous weld operations on the same materials. Thus, for practical purposes the weld current interval is the primary determinant of the fall time $t$ of weight 35.

If the weld current pulse width is fixed, a desired weld depth $d$ may be readily achieved by proper selection of moment arms $x$ and $y$. If moment arm $x$ is fixed, as will usually be the case, selection of moment arm $y$ determines the weld depth $d$. For example, utilizing equation (3) and assuming a desired weld collapse $d$ of 0.010 inch and a fall time $t$ of 3 ms, solving for $y$ yields a result of 1.74 inches. Thus, placement of the weight 1.74 inches from connecting arm 15 produces the desired 0.010 inch depth of weld. If on the other hand the fall time $t$ is 5 ms and the same depth of weld is desired, the derived expression yields a value for $y$ of 4.83 inches.

It is to be stressed that the depth of weld is not dependent upon the force W exerted by weight 35 on beam 10. However the force W is crucial in determining the forging force applied by the electrodes against the workpiece. This forging force F, which squeezes workpieces 25 and 27 together, is critical to obtain uniform characteristics. Since F is determined by the expression $Wy/x$, once $y$ is selected to produce the desired weld depth, $W$ may then be selected to produce the desired welding force $F$.

Where power supply 29 is provided with means for varying the width of the weld current pulse $t$, another variable is provided whereby a desired weld depth may be obtained. Specifically, if it is desired to maintain moment arm $y$ fixed, the fall time $t$ may be selected by transposing the expression above to read as follows:

$$t = \sqrt{\frac{2yd}{ax}} \quad (4)$$

For example, assume that $x$ is 10 inches and $y$ is 2 inches and that a desired weld depth $d$ of 0.01 inch is required. Under such circumstances the width of the weld current pulse should be selected to provide a fall time of approximately 3.2 ms. On the other hand, if $x = y = 10$ inches, and the desired weld depth $d$ remains the same, the required weld current pulse width $t$ should be adjusted to provide a fall time of approximately 7.2 ms.

While the above analysis ignores the effect of the weight of beam 10, frictional forces acting in opposition to pivoting, and forces with which the weld resists displacement of electrode 21, the principles outlined above are still valid. More particularly, these effects may act to modify the value of $a$ to the extent that the weight 35 does not fall with precisely gravitational acceleration. In those cases where significant departure from gravitational acceleration occurs, the value of $a$ has some value other than 32.2 ft/sec$^2$. Under such circumstances empirical calibration permits accurate values of $F$ and $d$ to be determined.

Referring now to FIG. 2 of the accompanying drawings there is diagrammatically illustrated a welder employing the principles described in realtion y FIG. 1 but in which the welding force $F$ is exerted horizontally. More particularly, a folded beam 40 comprises a normally horizontal lever arm 41 and a normally vertical lever arm 43. Beam 40 is pivotally mounted on support 49 at pivot point 47 such that both beams 41 and 43 are pivotable together. A variable weight $W$ may be positioned at a moment arm distance $y$ from pivot point 47 to produce a reactive force $F$, exerted by the workpiece against the electrode on arm 43 at distance $x$ from pivot point 47. The mathematical expressions (1) through (4) derived above in terms of $x$, $F$, $W$, $Y$, $t$, $S$ and $d$ are equally appropriate for the embodiment of FIG. 2. Examination of FIGS. 1 and 2 indicates that the welding force exerted by the electrode on the workpiece may be in any direction, depending upon the type of lever arrangement employed. In other words, force $F$ need not be applied vertically or horizontally but at some other angle if the situation so dictates. Furthermore, the weighted arm (11, 41), while preferably horizontal, may also be at some other angle. If the latter is not horizontal, however, weight 35 does not fall with the gravitational acceleration but rather at some fraction thereof determined by a resolution of vectors. It is contemplated, because of the simplicity of the arrangement, that the principles of the present invention will have their widest applicability in situations where the weighted arm normally extends horizontally.

Referring now to FIGS. 3 through 7, there is illustrated in a preferred embodiment, a welding head constructed in accordance with the principles of the present invention to produce a horizontally-directed welding force F in the manner described in relationship to FIG. 2. More particularly, the welding head, designated generally by the numeral 50, is mounted on a vertical cylindrical column 51 similar to that used in a bench drill press. Column 51 extends through a horizontally-extending portion 56 of the welding head into a mounting block 53 which is supported on a flat support table 55. The height of welding head 50 above support table 55 is adjustable by means of a hand crank 57 which rotates a threaded column 59 coextensive with and parallel to support column 51. Horizontal portion 56 of welding head assembly 50 includes a threaded aperture arranged to engage threaded column 59 so that the welding head may ride up and down column 51 in accordance with rotation of crank 57. A locking mechanism, including a knob 61 capable of rotating a threaded rod 63, permits the welding head assembly to be locked at a desired height above the support table 55. More specifically, rod 63 extends through horizontal portion 56 of the welding head assembly in a direction perpendicular to support column 51. Threadedly engaging rod 63 are a pair of internally threaded cylinders 65 and 67 which are oppositely threaded relative to one another. When knob 61 is rotated in one direction the cylinders move toward one another and are contoured to grip support column 51. When knob 61 is turned in the opposite direction cylinders 65 and 67 disengage support column 51.

A small projection 54 of generally rectangular cross section extends radially from cylinder 51 along its entire length. A channel 52 defined in horizontal section 56 of the head assembly receives projection 54 and prevents the head assembly from rotating about the cylinder.

The horizontal section 56 of welding head assembly 50 extends forwardly of support column 51 to join a vertically depending portion of the welding head which carries the welding electrodes and the electrode actuator mechanism. More particularly, the vertical section of the welding head assembly includes a pair of depending end plates 69 and 71 joined together at their upper ends by spaced front and rear plates 73 and 75, respectively. The lower portions of spaced end plates 69 and 71 are joined by a pair of spaced, smooth metal rods 77 and 79. Additional joining means for end plates 69 and 71 is provided by a rear plate 81 which extends between the two end plates and is secured thereto.

A fixed electrode support member 83 extends vertically between end plates 69 and 71 and between front and rear plates 73 and 75. Support member 83 is provided with a pair of channels or tracks proximate its upper end, which tracks are arranged to slidably engage, in a horizontal plane, front and rear plates 73 and 75, respectively. The upper section 85 of support member 83, which section defines the top walls of the tracks, is threadedly engaged by screw 87 extending upwardly from the main body of support member 83. A handle 89 is provided for section 85 to permit the latter to be adjustably spaced from main body 83. This in turn permits tightening and loosening of the tracks about plates 73, 75 so that the position of support member 83, relative to end plates 69 and 71, may be selectively locked or unlocked. When unlocked, movement of support member 83 between end plates 69 and 71, may be selectively locked or unlocked. When unlocked, movement of support member 83 between end plates 69 and 71 can be effected by means of an adjustment screw 91 which extends through and is threadedly engaged by a suitably provided aperture 68 in end plate 69. The exterior end of adjustment screw 91 is provided with an adjustment knob 93 to facilitate rotation of the screw whereas the interior end of screw 91 is journaled in an appropriate depression 84 provided in support member 83. When locking member 85 is loosened, rotation of knob 93 causes motion of support member 83 relative to end plate 69. Importantly, however, support member 83 remains fixed relative to end plates 69 and 71 during a welding operation; positional adjustment of support member 83, as will be more clearly understood from the description below, is provided to render the welding head capable of accommodating workpieces of various sizes and configurations.

Support member 83 extends between cylindrical bars 77 and 79 and terminates in a depending support bar 95. An electrode holder 97 is secured to the support bar 95 and carries a welding electrode 99 in such relationship that the electrode extends downwardly and away from end wall 69. Electrode 99 serves as a fixed electrode for the welding head.

The welding head also includes a movable electrode 101, so named because of its movement during a welding operation. To this extent welding electrode 101 corresponds to electrode 21 in FIG. 1, whereas welding electrode 99 corresponds to electrode 23. Electrode 101 is supported by an electrode holder 103 which in turn is secured to a support bar 105, the latter two elements being substantially identical to electrode holder 97 and support bar 95 described above. Support bar 105 depends from a carriage 107 which slidably engages the smooth, metal cylindrical bars 77 and 79. More particularly, carriage 107 is arranged to slide horizontally along bars 77 and 79 by means of four precision ball bushings 109 (two of which are illustrated in FIG. 4). The engagement between the carriage 107 and the bars 77 and 79 is thus substantially frictionless; in addition carriage 107, support bar 105 and electrode holder 103 are made of light weight material so as to have relatively negligable mass.

Motion of the movable electrode holder 103 is effected by means of a pair of lever arms pivotable together about a common point in a manner described above in relation to FIG. 2. More particularly, a vertical lever arm 111 is pivotally mounted, by means of pivot pin 113, between front and rear plates 73 and 75 and extends downwardly between the plates at a location proximate end plate 71. The upper end of lever arm 111 terminates in a substantially rectangular surface on which is mounted one end of a normally horizontal lever arm 115. The other end of lever 115 extends over and beyond end plate 71 and is provided with a plurality of slots (number 1 through 7 in the drawings) defined in the upper surface of arm 115 and arranged to receive projections depending from various weighted blocks 117. Depending on the weight of block chosen and the slot in which the block is inserted in arm 115, the torque applied to arm 115 about pivot point 113 may be selectively adjusted. Linkage between the movable electrode holder 103 and vertical lever arm 111 is provided by means of a flat rigid strip 119 of metal or the like which is secured to both lever arm 111 and carriage 107.

An actuator is pivotally mounted on the outer surface of end plate 71 and includes a relatively long arm 121 extending rearwardly of end plate 71 and a relatively short arm 122 extending forwardly of the end plate. Arm 121 has a chain 123 secured to its remote end, which chain depends vertically through an appropriate hole in table 55 to a foot pedal 125. Depression of pedal 125 acts to pull arm 121 and pivot it in a clockwise direction about pivot point 102. Forward arm 122 is threaded to engage a tension adjusting screw 127, the lower portion of which has a tension spring 129 depending therefrom. The lower end of spring 129 is secured to a bolt or similar member 131 projecting from end plate 71. Spring 129 acts to oppose clockwise motion of actuator arm 121 by pulling downwardly on arm 122. An actuating finger 135 is also pivotally mounted at pivot point 120 and is fixedly secured to arm 121 so as to be pivotable therewith. Finger 135 extends generally upwardly toward lever arm 115. When arm 121 is in its clockwise-most position, finger 135 is urged against lever arm 115 to force the latter upwardly, thereby separating electrodes 99 and 101. When actuator arm 121 is in its extreme counter-clockwise position lever arm 115 is not engaged by finger 135 and electrode 101 is urged by weight 117 toward electrode 99. If, as illustrated in FIG. 7, a pair of workpieces 137 and 139 are inserted between the electrodes, the force transmitted by weight 117 produces a welding force against the workpieces.

In operation, the welding head may be operated by having the electrodes 99 and 101 normally open or normally closed. If normally closed operation is desired, foot pedal 125 is actuated to separate the electrode for insertion of the workpieces therebetween. The foot pedal is then released and the welding force is exerted against the workpieces. A separate switch is then employed to fire the power supply 141 to initiate the welding operation. If normally open electrode operation is desired, the foot pedal may be arranged to close the electrodes after the workpieces are inserted and upon further depression of the foot pedal 125 the power supply is automatically fired. Selection of normally open and normally closed operation is achieved by simply adjusting the tension in spring 129 by means of adjustment screw 127. In either type of operation, lever arms 115 and 111 are free to rotate clockwise (viewed in FIG. 4) at the time welding current is initiated. As the weld softens electrode 101 penetrates the workpieces in substantial accordance with expressions (1) through (4) derived above. Power supply 141 is connected across electrodes 99 and 101 and may provide either a fixed or variable current pulse width; in either case the parameters $y$ and $W$ may be varied to produce desired weld characteristics for a given weld operation.

Difficult-to-weld material combinations have been successively welded using the welding head employing the principles of the present invention. For example copper and copper-clad metals have been readily welded to nickel-iron alloys, Kovar, etc., the welds in such cases having characteristics which were readily repeatable.

Apart from the basic principles of operation of the present invention which permit uniform weld characteristics to be readily repeated, the embodiment illustrated in FIGS. 3 through 7 has a number of other advantages. For example, relatively large gaps between electrodes 99 and 101 may be provided if desired by properly positioning the support member 83. In addition the height of the welding head 50 above work table 55 is easily adjusted so that work pieces of various configurations and sizes may be readily accommodated. Further, and as described above, normally open or normally closed electrode operation may be selected by means of a simple adjustment.

While I have described and illustrated specific embodiments of my invention, it will be clear that variations of the details of construction which are specifically illustrated and described may be resorted to without departing from the true spirit and scope of the invention as defined in the appended claims.

I claim:

1. A welding head, comprising a support member, a pair of welding electrodes, first and second lever arms disposed at right angles to one another, means pivotally supporting said first and second lever arms at a pivot point such that said first and second lever arms are pivotable together about said pivot point, means securing at least one of said welding electrodes to said first lever arm at a predetermined distance from said pivot point, means for applying a variable torque to said second lever comprising means for receiving a weight of variable amount at variable locations along the length thereof, means for spacing said welding electrodes in contact with said elements to permit at least a portion of the elements to be welded to present a resistive current path between said welding electrodes and such that said elements are urged together by said electrodes with a horizontal force determined by the torque applied by said weight to said second lever arm, supply means for passing a pulse of welding current between said welding electrodes for a specified time interval, said welding current being sufficiently high to soften said elements to be welded and thereby to enable full force of said weight under the influence of gravity.

2. The welding head according to claim 1 wherein the weighting location y on said second lever arm, for a given welding operation, is given by the following expression:

$$y = \frac{x}{d} \cdot (1/2\, at^2)$$

where $x$ is said predetermined distance between said at least one welding electrode and said pivot point; $d$ is a desired depth of the weld to be formed; $a$ is the gravitational acceleration constant; and $t$ is the period of time during which said elements to be welded are softened by welding current passed between the electrodes.

3. The welding head according to claim 1 wherein said supply means comprises a welding current supply having a selectively variable welding current interval selected for a given welding operation in accordance with the following expression:

$$t = \sqrt{\frac{2yd}{ax}}$$

where $t$ is the interval of time during which said elements to be welded are softened in response to said welding current interval, $y$ is the weighting location on said second lever arm, $d$ is the desired depth of weld, $a$ is the gravitational acceleration constant, and $x$ is said predetermined distance between said at least one welding electrode and said pivot point.

4. The welding head according to claim 1 wherein for a given welding operation the weighting W of said second lever arm is determined by the following expression:

$$W = Fx/y$$

where $F$ is the desired forging force to be applied against said elements by said electrodes, $x$ is said predetermined distance between said at least one welding electrode and said pivot point, and $y$ is the weighting location on said second lever arm; and wherein y is determined by the expression:

$$y = \frac{x}{d}\,(1/2\,at^2)$$

where $d$ is the desired depth of weld, $a$ is the gravitational acceleration constant, and $t$ is the period of time during which the elements to be welded are softened by the welding current passed through said welding electrodes.

5. In the method of welding a workpiece which includes the steps of urging a pair of spaced welding electrodes against said workpiece to apply a predetermined compressive force thereto by applying a weight thereto via a lever arm; passing a welding current of predetermined duration through said electrodes and said work piece to soften said workpiece and permit penetration of at least one of said electrodes into said workpiece in response to said weight, the improvement comprising adjusting the position of said weight along said lever arm to provide penetration of said workpiece to a desired depth over a period of time in excess of said predetermined duration, and selecting the value of said weight to establish said predetermined compressive force.

* * * * *